(12) United States Patent
Lastinger et al.

(10) Patent No.: US 6,621,410 B1
(45) Date of Patent: Sep. 16, 2003

(54) SYSTEM FOR ITEM AND ORIENTATION IDENTIFICATION

(75) Inventors: Roc A. Lastinger, Mesa, AZ (US); James L. Rodgers, Mesa, AZ (US); John J. Coulthard, Scottsdale, AZ (US); Robert P. Ufford, Roswell, GA (US)

(73) Assignee: RF Code, Inc., Mesa, AZ (US)

( * ) Notice: Subject to any disclaimer, the term of this patent is extended or adjusted under 35 U.S.C. 154(b) by 0 days.

(21) Appl. No.: 09/410,897

(22) Filed: Oct. 2, 1999

Related U.S. Application Data

(63) Continuation-in-part of application No. 08/702,950, filed on Aug. 26, 1996, and a continuation-in-part of application No. 09/372,274, filed on Aug. 11, 1999, which is a continuation-in-part of application No. 09/088,924, filed on Jun. 2, 1998, now abandoned.

(51) Int. Cl.[7] .............................. G01S 13/02
(52) U.S. Cl. ................. 340/10.42; 340/10.1; 340/572.7
(58) Field of Search .................. 340/10.42, 10.1, 340/10.33, 10.51, 572.1, 572.5, 572.7; 29/25.42

(56) References Cited

U.S. PATENT DOCUMENTS

| | | | |
|---|---|---|---|
| 4,369,557 A | * | 1/1983 | Vandebult ................... 29/25.42 |
| 4,752,680 A | | 6/1988 | Larsson |
| 4,792,790 A | | 12/1988 | Reeb |
| 4,910,499 A | | 3/1990 | Benge et al. |
| 5,119,070 A | | 6/1992 | Matsumoto et al. |
| 5,381,137 A | | 1/1995 | Ghaem et al. |
| 5,473,330 A | | 12/1995 | Lauro et al. |
| 5,477,210 A | * | 12/1995 | Belcher .................... 340/572.1 |
| 5,604,485 A | * | 2/1997 | Lauro et al. .............. 340/572.5 |
| 5,661,470 A | * | 8/1997 | Karr ........................ 340/10.33 |
| 5,942,987 A | | 8/1999 | Heinrich et al. |
| 6,104,311 A | * | 8/2000 | Lastinger ................. 340/10.51 |
| 6,362,737 B1 | * | 3/2002 | Rodgers et al. .......... 340/572.1 |

FOREIGN PATENT DOCUMENTS

| | | | |
|---|---|---|---|
| WO | WO 01/257817 A2 | * | 4/2001 |

\* cited by examiner

Primary Examiner—Edwin C. Holloway, III
(74) Attorney, Agent, or Firm—William R. Bachand; Squire, Sanders & Dempsey L.L.P.

(57) ABSTRACT

A system includes an identification circuit, a grid antenna, a receiver, and a processor. The identification circuit includes resonant circuits formed on a substrate within a perimeter. Identification may be based on a quantity or physical arrangement of detected resonant circuits within the perimeter. One resonant circuit provides a reference signal. Any resonant circuit may be tuned in accordance with the reference signal by the addition or subtraction of reactance formed on the substrate. A capacitance of a first group of capacitors located outside a turn of an inductor is roughly equal to a capacitance of a second group of capacitors located inside the turn. Any resonant circuit may also be tuned by affixing a resonance modifying element, for example a sticker, to the identification circuit. The grid antenna provides antenna field patterns, one for each cell location. The receiver communicates with the identification circuit via the grid antenna. The processor controls the receiver according to a method including: (a) detecting a first signal at a first grid location; (b) determining an offset as a difference between a frequency of the first signal and a predetermined frequency; (c) detecting a second signal at a second grid location; (d) determining an identification in accordance with the first and second locations, the second signal, the offset determined in step (b), and any offset accomplished by a sticker; and (e) determining an orientation in accordance with the first and second grid locations.

49 Claims, 10 Drawing Sheets

SYSTEM FOR ITEM AND ORIENTATION IDENTIFICATION

This application is a continuation-in-part application of, and claims priority from, U.S. patent application Ser. No. 08/702,950 by Lastinger, filed Aug. 26, 1996; and, a continuation-in-part application of, and claims priority from, U.S. patent application Ser. No. 09/372,274 by Rodgers, et al., filed Aug. 11, 1999, which is a continuation-in-part application of U.S. patent application Ser. No. 09/088,924 by Rodgers, et al., filed Jun. 2, 1998 now abandoned. These related applications are incorporated herein by reference.

FIELD OF THE INVENTION

Embodiments of the present invention relate to systems for item orientation and/or item identification.

BACKGROUND OF THE INVENTION

In a conventional system using radio frequency identification (RFID) for item identification, one or more interrogation units detect and establish communication with one or more RFID devices (e.g., labels or tags). Interrogation units may cooperate with general purpose and special purpose computers to form an integrated system for any business purpose including, for example, security or inventory management. In operation, identification devices are attached to inventory items that then move into and out of communication range. When within the range of a particular interrogation unit, the interrogation unit determines the presence of the tag, determines an identification of the tag, and, based on the processing station at which the particular interrogation unit is associated, and causes particular process steps related to item location to be noted, for example, completion of a receiving, assembly, shipping, purchase, or sale transaction involving the item. In such a system, reliable and accurate detection and identification are highly desirable. When inventories having wide variety are to be managed, it is also highly desirable to utilize a large number of unique identifications. These features present a challenge to system design where the cost of interrogation units and tags are constrained.

Conventional systems, where detection and/or identity is based at least in part on the tag having one or more resonant circuits, fail to provide numerous features which may be desirable in any combination to meet particular system design goals. For example, when a tag includes multiple resonant circuits, it would be desirable (a) to account for manufacturing tolerances, aging, and external de-tuning effects to increase accuracy of detection and identification; (b) to facilitate recognition of an orientation of an item with respect to an interrogation unit; (c) to permit manually altering or supplementing the original identification provided by a tag; (d) to increase the number of identifications with little effect on the cost of manufacturing a tag; (e) to improve the initially manufactured accuracy of resonant circuits; and (f) to increase the speed of factory testing of tags.

Without systems, devices, and methods of the present invention, the above desirable features cannot be easily obtained. Systems that may benefit from or may require some or all of these features may remain economically infeasible, leaving unsatisfied a wide range of potential applications for item and orientation identification technology.

SUMMARY OF THE INVENTION

A system for detecting an orientation of a provided responder, according to various aspects of the present invention, includes a receiver and a processor. The receiver is selectively coupled to each antenna of a provided plurality of antennas. The processor is coupled to the receiver for performing a method which includes the steps in any order of: (a) detecting a first response within a first band, detecting being by the receiver via use of a first antenna of the plurality, the first antenna having an antenna field pattern covering a first location; (b) detecting a second response by the receiver via use in turn of each of a multiplicity of antennas of the plurality each having a respective antenna field pattern covering a respective second location; and (c) detecting the orientation of the responder in accordance with indicia of the first location, indicia of the second location, and indicia of an expected relationship between the first location and the second location.

By determining each response with an antenna having an antenna field pattern covering a different location, the relative location of responses may indicate whether the responder is misoriented with respect to the locations. Further communication or further processing of the item identified as misoriented may account for such misorientation, resulting, for example, in improved communication, opportunity for correction of orientation to improve productivity, and improved quality management.

A system for identifying a provided responder, according to various aspects of the present invention, includes a receiver and a processor. The receiver is selectively coupled to each antenna of a provided plurality of antennas. The processor is coupled to the receiver for performing a method which includes the steps in any order of: (a) detecting a first response within a first band, detecting being by the receiver via use of a first antenna of the plurality, the first antenna having an antenna field pattern covering a first location; (b) detecting a second response by the receiver via use in turn of each of a multiplicity of antennas of the plurality each having a respective antenna field pattern covering a respective second location; and (c) determining an identification of the responder in accordance with indicia of the first location, indicia of a particular second location, and indicia of an expected relationship between the first location and the particular second location.

By determining each response with an antenna having an antenna field pattern covering a different location, the relative location of responses may be used as part of the identification of the responder. Because several relative locations are economically feasible in a responder, use of indications of relative location greatly multiply the number of unique identifications a given responder design can accommodate.

A system for identifying a provided responder, according to various aspects of the present invention, includes a receiver and a processor. The receiver is coupled to a provided antenna. The processor is coupled to the receiver for performing a method which includes the steps in any order of: (a) detecting by the receiver a first response within a first band; (b) determining a first frequency offset by comparing a frequency of the first response to a predetermined frequency; (c) determining a second band in accordance with the first frequency offset; (d) determining a third band in accordance with the first frequency offset; (e) detecting by the receiver a second response within the second band; (f) detecting by the receiver a third response within the third band; and (g) determining an identification of the device in accordance with indicia of the second band and indicia of the third band.

By determining the bands for the second and third responses with reference to a frequency offset, internal de-tuning effects (e.g., manufacturing tolerances and aging) and external de-tuning effects (e.g., presence of a metal object in the antenna field pattern of the device) are accounted for.

A responder, according to various aspects of the present invention, includes a plurality of resonant circuits formed on a substrate. Each resonant circuit includes a coiled conductor, a first plurality of capacitors, and a second plurality of capacitors. The coiled conductor is formed on a first side of the substrate and has an interior region surrounded by at least one turn of the coiled conductor and has an exterior region outside the at least one turn. The first plurality of capacitors is formed in the interior region with a dielectric of each capacitor including a respective portion of the substrate. The first plurality of capacitors provides a first capacitance by being selectively decoupled from parallel combination with respect to other capacitors of the first plurality. The second plurality of capacitors is formed in the exterior region with a dielectric of each capacitor including a respective portion of the substrate. The second plurality of capacitors provides a second capacitance by being selectively decoupled from parallel combination with respect to other capacitors of the second plurality. In operation a current flows through a series circuit comprising the first capacitance, the second capacitance, and the coiled conductor. After tuning to a desired resonant frequency of the current, the first capacitance is provided by a first number of capacitors, the second capacitance is provided by a second number of capacitors. The first capacitance is made to be substantially equal to the second capacitance. When equal sized capacitors are used, an absolute value of a difference between the first number and the second number is less than two.

By assuring that the plurality of capacitors located in the interior region provides a capacitance substantially equal to the capacitance provided by the plurality of capacitors located in the exterior region, improved accuracy of resonant frequency and higher resonant circuit quality factor ("Q") are obtained during initial manufacturing testing and in operation in the field. When multiple coiled conductors are used (e.g., one on each side of a substrate), each coil may provide substantially the same amount of inductance.

A responder, according to various aspects of the present invention, includes a first substrate and a second substrate. A plurality of functional circuits (e.g., resonant circuits) are provided on the first substrate. For a resonant circuit, each such circuit includes a conductor providing an inductance and a pair of conductors providing a capacitance. The second substrate is mechanically and electrically coupled to the first substrate. The second substrate includes a conductor for modifying a respective function of at least one functional circuit of the plurality on the first substrate. Electrical coupling may be by DC coupling or AC coupling and may modify circuit functions by at least one of enabling a function, modifying an operating characteristic, supplementing operation with a new function, disabling a function, or substituting a new function for an existing function.

Further, a method of establishing an identification for a responder, according to various aspects of the present invention, is performed with respect to a responder that includes a plurality of functional circuits formed on a first substrate. The method includes adhering a second substrate to the first substrate, the second substrate comprising a conductor for modifying a function of at least one circuit of the plurality. The identification of the responder is, therefore, determined in accordance with the respective reactance as modified.

By providing such a responder, tracking of items through check points and process stations is simplified. For example, an inexpensive sticker having a foil or conductive ink component may be used for indicating a quality assurance inspection in a machine readable manner. As another example, an easily modified resonant frequency characteristic of circuit provides additional unique identifications without expensive variation in the initial substrate manufacturing process.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

In the field of radio frequency identification (RFID), the need remains for a system that can detect objects passing near (e.g., over or beside) an antenna for purposes including counting the objects, recognizing the orientation of one or more of the objects, or identifying the objects (e.g., by reading a unique code). It is also highly desirable to manufacture responders (e.g., labels, tags, components, or assemblies, any of which provide an acoustic or radio frequency response signal) with a large number of individual identification codes at a low cost per device. These and other features discussed above are provided by systems, devices, and methods of the present invention that individually and in combination provide solutions to the problems of the prior art as discussed herein.

A system according to various aspects of the present invention includes any system having a monitor or interrogator that detects the orientation of a responder (e.g., the responder itself or impliedly the object, person, animal, or item to which the responder is associated or attached).

Alternatively, a system according to various other aspects of the present invention includes any system having a monitor or interrogator that detects indicia of an identification associated with a responder. Further, a system according to a combination of the above functions provides detection of orientation and identification.

Figure 1:
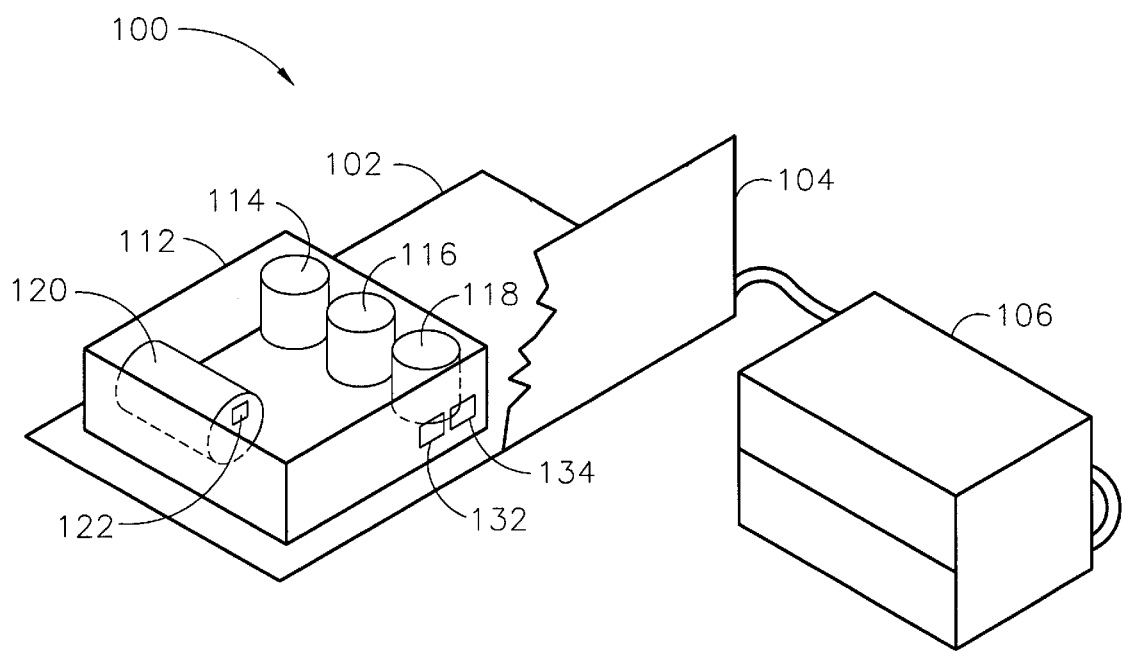
FIG. 1 is a plan view of a system and exemplary operating environment according to various aspects of the present invention.
Figure 2A:
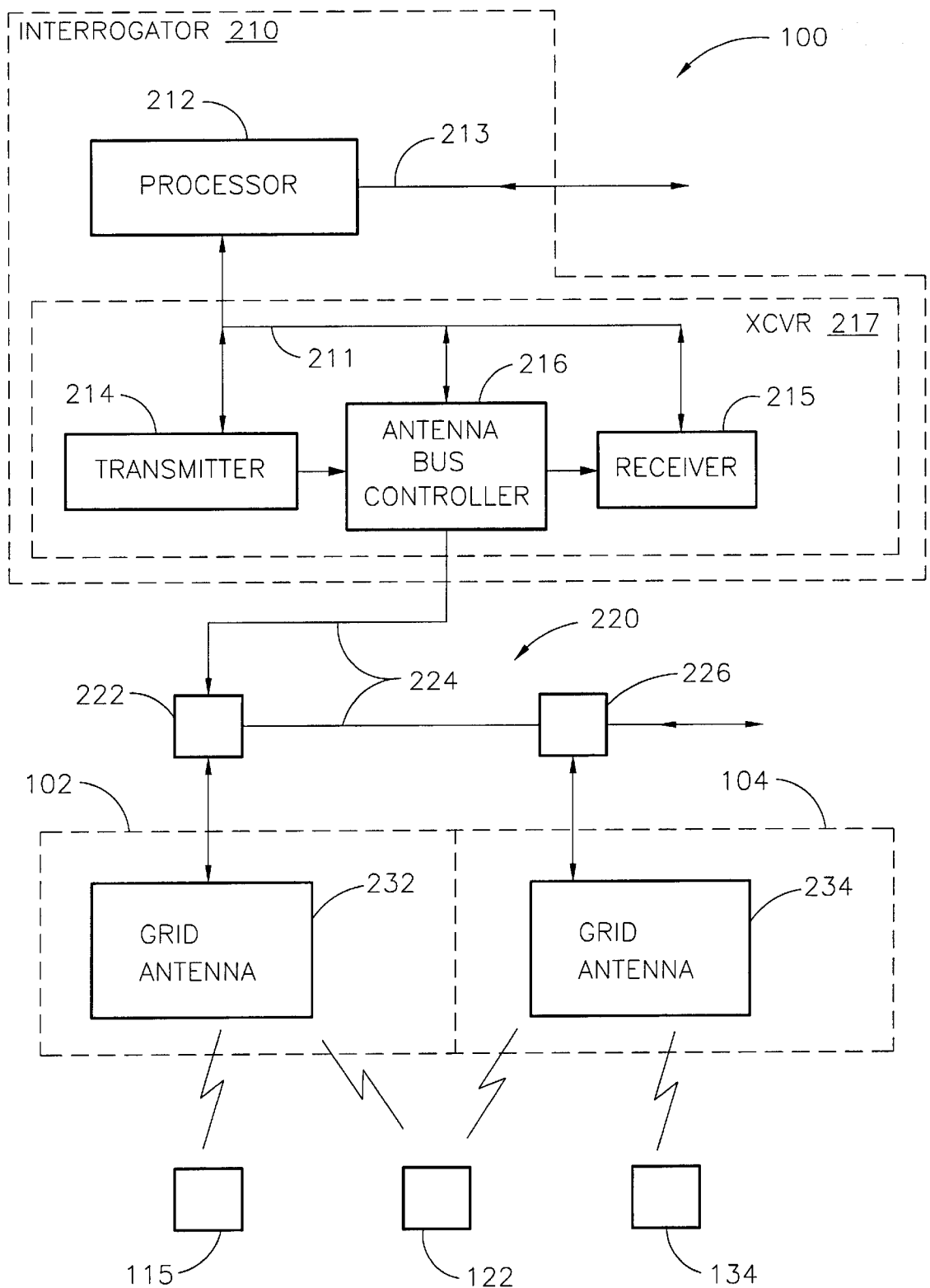
FIG. 2A is a functional block diagram of an interrogator and antenna system of the system of FIG. 1.
Figure 2B:
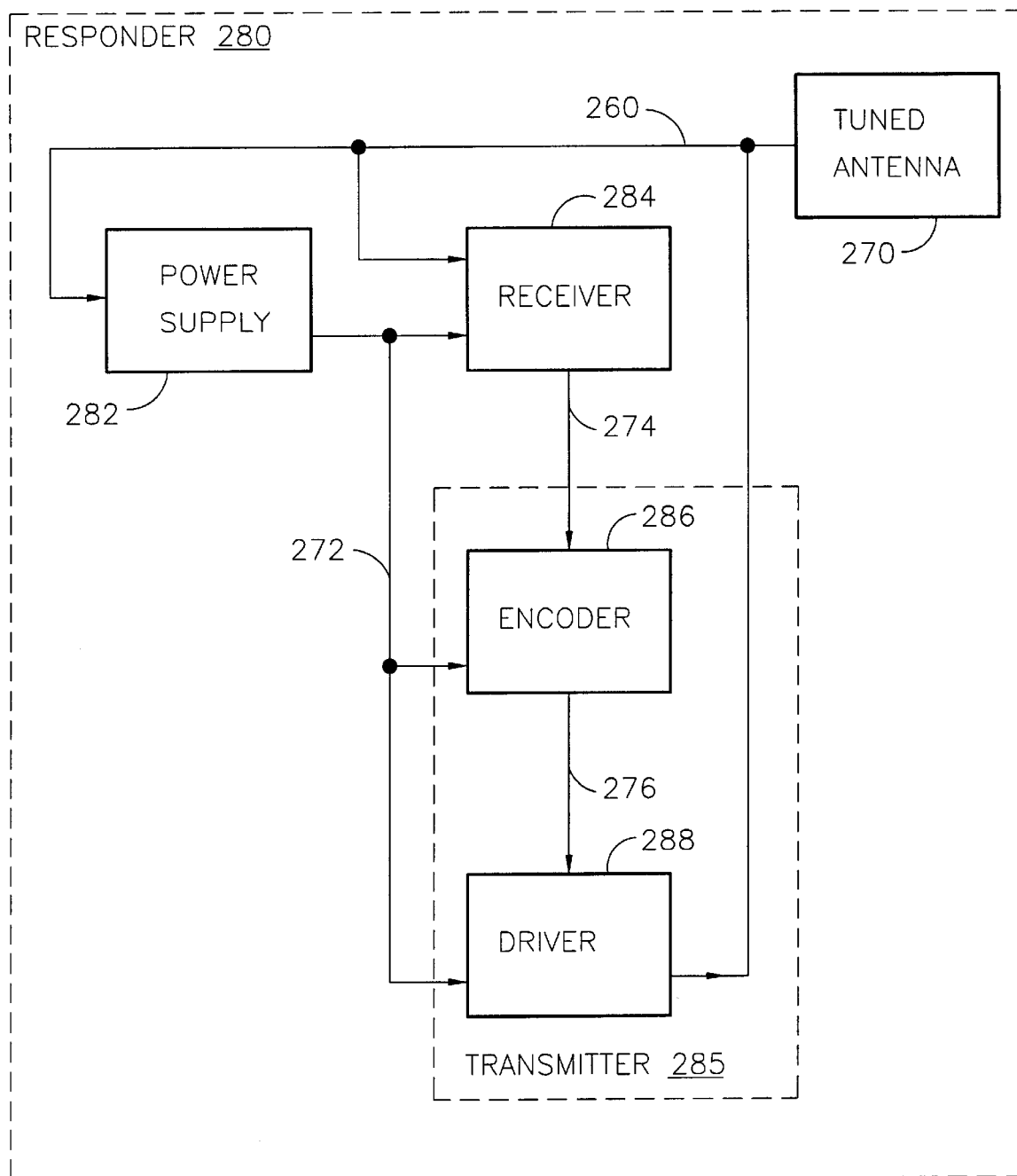
FIG. 2B is a functional block diagram of a responder of the system of FIG. 1.

For example, radio frequency based system 100 of FIGS. 1, 2A, and 2B includes antenna structure 102, antenna structure 104, and controller 106. Controller 106 includes a monitor or interrogator 210 and an antenna system 220. In an acoustic based system, acoustic radiators and pickups replace antennas in structures 102 and 104.

In operation, as shown, any carton 112 rests on top of antenna structure 102 and may be manually or automatically conveyed across antenna structure 102 by any suitable conveyor system. Carton 112 is also proximate to antenna structure 104 and contains any products, each having a responder attached thereto. As shown, responder 122 is attached to the bottom of product 120; responder 115 (not shown in FIG. 1) is attached to the under side of product 114; other responders (not shown) are attached to products 116 and 118; and responders 132 and 134 are attached to carton 112. Responders may be attached in any manner or integrated with the product, product packaging, next assembly, or carton.

An antenna structure according to various aspects of the present invention holds an antenna (or group of antennas) within an expected operating range of responders to be detected. For example, antenna structures 102 and 104 may be identical and may each include a conventional grid antenna (e.g., a matrix of antennas, or an array antenna) sufficient for permitting controller 106 to identify the grid location of a responder placed on or beside the antenna structure. Each antenna structure 102, 104 may be operated in a manner similar to the grid of a conventional bit tablet or the writing surface of a conventional pen operated personal data assistant (palm-top computer). Grid antennas 102 and 104 may be of the type described in U.S. Pat. No. 5,429,132, issued Jul. 4, 1995 to Guy et al.

Each antenna of a grid antenna provides a transmit antenna field pattern and a receive antenna field pattern each having a shape in 3-space that extends away from the antenna structure. If, for example, one antenna is used for both transmitting and receiving to detect presence of a resonant circuit near the antenna, then the antenna field patterns, transmitter power level, and receiver gain are suitably designed using conventional techniques to provide reliable detection within a short range from the antenna structure compared to the dimensions of the responder. When a responder is within an antenna field pattern and within a preferred working distance from the antenna structure, a contour of points of minimum reliable operation on a plane that intersects the combined transmit and receive antenna field patterns should enclose an area less than the area of the responder's effective antenna field pattern. In this way, responders that are close in operating frequency may be located in side-by-side relationship without permitting more than one antenna of an antenna grid to activate more than one responder. Antenna field patterns of near-by grid positions may overlap at distances beyond the maximum working distance so that, when detecting a single responder, a single grid position cannot be reliably ascertained.

Responders may include several resonant circuits formed in side-by-side non-overlapping relationship with each resonant circuit occupying about 1 square inch (2.54 cm$^2$). For detection, each grid antenna may cooperate with a receiver to permit a single grid position to be matched with a single resonant circuit at a working distance in the range from 0 to about 10 inches (25.4 cm), preferably 0 to about 6 inches (15.2 cm), measured perpendicularly from the face of the antenna structure.

With reference to antenna structure 104, for example, the location of responder 132 can be distinguished from the location of responder 134 even though these two responders are in immediate side-by-side relationship because each responder may be identified to a different grid location (e.g., each device is responsive in a cell of the grid antenna, or each device is maximally responsive in a cell different from the cell in which the other device is maximally responsive). Likewise, with reference to antenna structure 102, the responders on the bottoms of products 114, 116, and 118 may be separately identified to different grid locations. In addition, movement of responder 122 with reference to carton 112 may also be recognized, for example, by noting over time the relative location of responders 122 and 132.

Responders on the bottoms of products 114, 116, and 118 may be unrecognized via antenna structure 104 due to limited working distance from antenna structure 104 or a lack of alignment between polarized antenna field patterns of the responders and antenna structure 104. If detectable, these responders may be detected as misoriented with respect to antenna structure 104, or may be detected as partially or fully overlapping with respect to a grid location of antenna structure 104.

Although responders having only one resonant circuit may cooperate in systems according to various aspects of the present invention, particular advantages are realized by systems of the present invention that are designed to detect responders each having multiple resonant circuits in non-overlapping planar relationship. For example, when responder 122 includes multiple non-overlapping resonant circuits, responder 122 may be recognized as misoriented with respect to antenna structure 102 and oriented with respect to antenna structure 104 when each resonant circuit is identified to a single grid location of an antenna structure, as discussed above. As shown, multiple resonant circuits may overlap as to a single grid location of antenna structure 102, yet each resonant circuit may be separately identifiable to a different grid location of antenna structure 104.

System 100 may have one or more antenna structures. When more than one antenna structure is employed, antenna structures may be identical or may vary. For example, antenna structure 102 may have a grid antenna that cooperates with a receiver for relatively high spacial resolution at relatively short working distance as compared to the spacial resolution and working distance provided by the cooperation of antenna structure 104 and the same or a different receiver. Responders used with system 100 may vary to coordinate with differences in antenna structures. For example, responders 132 and 134 may have fewer resonant circuits (e.g., one each) and responders located on the bottom of products 114, 116, and 118 may have multiple resonant circuits each. Generally, where greater resolution is desired for detecting misorientation, responders with multiple resonant circuits and one or more antenna structures with closely space antenna field patterns are preferred. For a horizontal planar antenna structure, the two horizontal dimensions are generally many times the corresponding dimensions of an antenna in a responder. For example, an antenna structure formed in a warehouse floor may have dimensions each greater than 20 yards (18.3 meters) for detecting a responder having a loop antenna about 1.5 feet (45.7 cm) in diameter. Such an antenna may be attached or integrated in a conventional shipping pallet of goods.

A controller, according to various aspects of the present invention, includes any subsystem for monitoring or interrogating responders for the detection of orientation or identification as discussed herein. For example, controller 106 includes interrogator 210 and antenna system 220. Controller 106 may include multiple interrogators or monitors coupled to one or more processors. When used with beacon type responders, interrogator 210 may be replaced with a monitor wherein functions of transmitter 214 are omitted with concomitant simplifications in coupling antenna system 220 to receiver 215.

An interrogator, according to various aspects of the present invention, includes any combination of hardware and software (or firmware) that performs methods for detecting responder orientation and/or identification as discussed herein. An interrogator may include one or more transmitters, one or more receivers, and one or more processors for cooperation with one or more antenna structures each having one or more grid antennas, as discussed above. An interrogator may include a single transceiver integrated with a processor; or include a network of processors, transceivers, transmitters, and/or receivers to provide item and orientation identification at multiple physically separate locations. An interrogator may be of the type described as a monitor in U.S. patent application Ser. No. 09/372,274. For example, interrogator 210 of FIG. 2A includes processor 212 and transceiver 217. Processor 212 may be coupled to other conventional processors via conventional network 213.

A processor, according to various aspects of the present invention, includes any conventional computer (e.g., a microcontroller, microprocessor, general purpose personal computer, or host computer) with (or without) conventional peripherals (e.g., input/output devices, and devices for program and data storage). For example, processor 212 includes a microprocessor based digital computer with RAM and disk memory for executing methods of item and orientation identification discussed herein and includes conventional alarms, a conventional database for recording transactions involving detection of item and orientation identification, and cooperates with a conventional facility management computer system for business accounting, network data communication, and other conventional distributed processing functions.

Processor 212 is coupled to transceiver 217 for controlling all conventional aspects of transceiver operation (e.g., initialization; directing transmitting: timing, frequency, amplitude, modulation, etc.; and directing receiving: timing, frequency band, demodulation, gain, signal processing, etc.) and for directing selection of one or more antennas (or antenna cells) to be used for transmitting and/or receiving. Processor 212 receives status and results from transceiver 217 in any conventional format describing the cells in which responses were received.

A transceiver, according to various aspects of the present invention, includes any circuitry for detecting and/or communicating with one or more types of responder and may include a processor. For example, transceiver 217 detects and communicates with responders 115, 122, and 134. When a transceiver includes a processor, such a processor may manage communication between processor 212 and transceiver 217. In addition, such a processor may perform some or all of the steps of determining item orientation and/or identification. For example, a sequence of antenna selections and transceiver frequencies may be directed by processor 212 in detail by commands and responses (e.g., any suitable protocol) conveyed between processor 212 and transceiver 217; or, transceiver may regularly (or continuously) monitor the working field of grid antennas 232 and 234 and report (via any suitable protocol) item orientation status and/or item identification upon detection.

Transceiver 217 includes transmitter 214, receiver 215, and antenna bus controller 216. Transmitter 214, receiver 215, and antenna bus controller 216 receive control signals from and report status to processor 210 via bus 211.

An antenna subsystem couples one or more antenna structures to one or more interrogators. For example, antenna subsystem 220 includes antenna controllers 222 and 226, and antenna bus 224. Interrogator 210, via antenna bus controller 216 and antenna bus 224, provides commands to antenna controllers 222 and 226 for the connection of suitable antennas to transceiver 217, particularly transmitter 214 and receiver 215. The same or different antennas may be used for transmitting and receiving concurrently or in sequence (e.g., with suitable squelching). Antenna controllers may be coupled to each other and to other antenna controllers (not shown) by antenna bus 224 for deriving resulting signals by processing signals from different antennas. Antenna controllers 222 and 226 and antenna bus 224 may be of the type described in U.S. patent application Ser. No. 09/372,274. Some or all functions of transceiver 217 may be performed by circuits in antenna controllers 212 and 216, eliminating a separate transceiver and facilitating communication between processor 212 and antenna controllers directly.

An antenna controller, according to various aspects of the present invention, includes switching and coupling circuitry for selecting and coupling one or more antennas for use in detecting and/or identifying one or more responders. For example, each antenna controller 222 and 226 provides a respective electrical interface to one or more grid antennas as shown. Antenna controller 222 is coupled to grid antenna 232 of antenna structure 102 of FIG. 1; and, antenna controller 226 is coupled to grid antenna 234 of antenna structure 104 of FIG. 1. An antenna controller may also include circuits for squelching an antenna and for combining signals from several antennas.

Communication by transceiver 217 or processor 212 with antenna controllers (e.g., including communication via antenna bus 224) may be according to any logical and any physical network architecture (e.g., star, daisy-chain, bus, multiple-mastered, packet switched, and/or with subnetworks).

The cooperative functions of processor 212, transceiver 217, and antenna controllers 222 and 226 may be performed by a monitor, antenna controllers, and antenna bus of the type described in U.S. patent application Ser. No. 09/372,274.

Responder 115, located on the bottom of product 114 (see FIGS. 1 and 2A), is within a working distance of antenna structure 102 for communication via grid antenna 232 and its grid location is recognized by the cooperation of transceiver 217 and processor 212, as discussed above. Likewise, responder 134 is within a working distance of antenna structure 104 for communication via grid antenna 234 and its grid location is recognized by the cooperation of transceiver 217 and processor 212. Responder 122 is within a detection range of both grid antennas 232 and 234; however, its misorientation with respect to antenna structure 102 and its orientation with respect to antenna structure 104 are recognized by the cooperation of transceiver 217 and processor 212 as discussed above.

A responder, according to various aspects of the present invention includes any device that provides a signal from which the orientation and/or identity of the responder may be derived. A responder for use in any of the systems discussed above may include the functions of conventional identification devices or responders (as described by representative examples in Table 1) in addition to functions described further below with reference to various aspects of the present invention.

TABLE 1

| System Functional Consideration | Responder Functional Alternatives |
| --- | --- |
| (1) Self-powered or powered by system transmitter (e.g., an interrogator or zone transmitter). | (a) Active responder may include power supply having energy input from other than a signal from a system transmitter (e.g., battery or solar cell).<br>(b) Passive responder receives a signal from which operating power is derived. Signal may be a query signal. |
| (2) Self-initiated or query-initiated response. | (a) Self-initiated responder (e.g., a beacon) may provide response signal at any time directed by the responder itself or stimulus other than a query provided by a system transmitter. The system may use a monitor or an interrogator.<br>(b) Query-initiated responder does not initiate communication with a system interrogator. System uses at least one interrogator. Query may enable/disable beacon behavior. |
| (3) Query/response interval; when a responder is to provide its response signal. | (a) No query. Responder operates as a beacon.<br>(b) After a query: a predetermined time interval; a unique time interval; a random time interval; or an interval as directed in the query.<br>(c) After another responder's response at the time intervals described in (b). |
| (4) Responder receiver complexity. | (a) No separate receiver. Responder uses a resonant circuit (e.g., a tuned antenna circuit or tank circuit having an antenna comprising an inductive element) to absorb energy indicating presence of the responder to a monitor or interrogator. Transmitted energy at the resonant circuit's resonant frequency constitutes a query signal.<br>(b) Has a detector and enables provision of a response when a signal with expected features is detected. Features may include one or more frequencies, one or more amplitudes, particular waveforms, one or more particular pulses, digital encoding, or combinations thereof. Query signal is formed or modulated with expected features.<br>(c) Has a detector for address (e.g., individual, group, or subgroup address) detection and may further perform command detection to respond when addressed and commanded (e.g., initialized, enabled, not disabled). The query signal has a particular address and command format. |
| (5) Responder transmitter complexity. | (a) No separate transmitter. Responder uses a resonant circuit (e.g., a tuned antenna circuit or tank circuit having an antenna comprising an inductive element) to provide a ring signal as the response signal.<br>(b) As in (a), additionally having a driver that sustains signal provision by the tuned antenna circuit.<br>(c) A in (b), additionally having an encoder that controls the driver to provide a transmitted signal having one or more frequencies, one or more amplitudes, particular waveforms, one or more particular pulses, digital encoding, or combinations thereof. Such an encoder may include, e.g., a timer, a modulator, a sequencer, a memory circuit, a data selector, a shift register, or combinations thereof.<br>(d) As in (c) wherein the encoder additionally has logic circuitry for providing data including, e.g., an identification code, measurement data from sensors, or memory contents. |
| Receiver and transmitter cooperation. | (a) Responding in one or more frequency bands (e.g., as provided by a resonant circuit) related to the one or more frequency bands of a query signal (if any). Operative power may be received in the same or different frequency bands, e.g. using the same or different tuned antenna or resonant circuits.<br>(b) Responding in one or more frequency bands that differ from the one or more frequency bands related to a query signal.<br>(c) Receiving and responding concurrently or sequentially.<br>(d) Responding at a sequence of frequencies.<br>(e) Responding at a sequence of times or with a sequence of modulations. |

Responders 115, 122, and 134 may be of any type having any combination of features discussed above. For example, responder 280 of FIG. 2B may be made using conventional techniques and used in various configurations for any purpose described above for a responder.

By way of contrast, a simple form of responder operative as a passive frequency responsive device includes tuned antenna 270 and all other functional blocks may be omitted. Tuned antenna 270 (which may be replaced by an acoustic sensor and radiator as discussed above) primarily includes a resonant circuit, also called a tank circuit. Tuned antenna 270 may be of the type described in U.S. patent application Ser. No. 09/372,274.

When functions of a receiver as described above are desired, responder 280 may include receiver 284 coupled to tuned antenna 270. Receiver 284, in a conventional manner, upon receiving an expected signal on line 260 may enable (rather than inhibit) a response ring signal in tuned antenna 270 in any conventional manner (signal lines not shown).

For increased operating range, a responder in another form may include tuned antenna 270, power supply 282, and driver 288. Power supply 282, in a conventional manner, provides operative power on line 272 to driver 288 derived from energy received by tuned antenna 270. Further, when time-domain signaling (e.g., particular pulse numbers, widths, and spacings) is desired to be transmitted (e.g., for identification, status, or sensor data), a responder may be used having, in addition, an encoder 286 coupled to control driver 288 with signals on line 276 in any conventional manner.

When functions discussed above with respect to address detection, command decoding and performance, and transmission of digital codes are desired, responder 280 may include tuned antenna 270, power supply 282, receiver 284, and transmitter 285. Tuned antenna 270 may include two or more resonant circuits when different frequency bands are used for reception of power, reception of a query (or control) signal, and transmission of signals for orientation or identification. Receiver 284 may include any number of conventional detectors and/or demodulators and may include logic circuits (e.g., a microcontroller) for serial to parallel data conversion, code conversion, address comparison, and command decoding. Receiver 284 may also include memory circuits for retaining information (e.g., state change, addresses, and configuration control information). Receiver 284 controls (e.g., enables) transmitter 285 when proper signals have been received. Transmitter 285 may include encoder 286, enabled (e.g., when commanded and addressed) by receiver 284 on line 274, and driver 288, controlled by encoder 286. Encoder 286 may include any conventional memory or logic circuitry (e.g., a microcontroller) for providing data for transmitting messages (e.g., status codes, identification codes, sequences of transmitter configurations for transmitting, and transmitter frequency and amplitude controls). Encoder 286 may also include one or more conventional sensors (e.g., temperature, humidity, vibration, or shock). Finally, power supply 282 may include any conventional charge storage circuitry, charge pumps, and/or one or more battery or power cells (e.g., solar or vibration).

Figure 3:
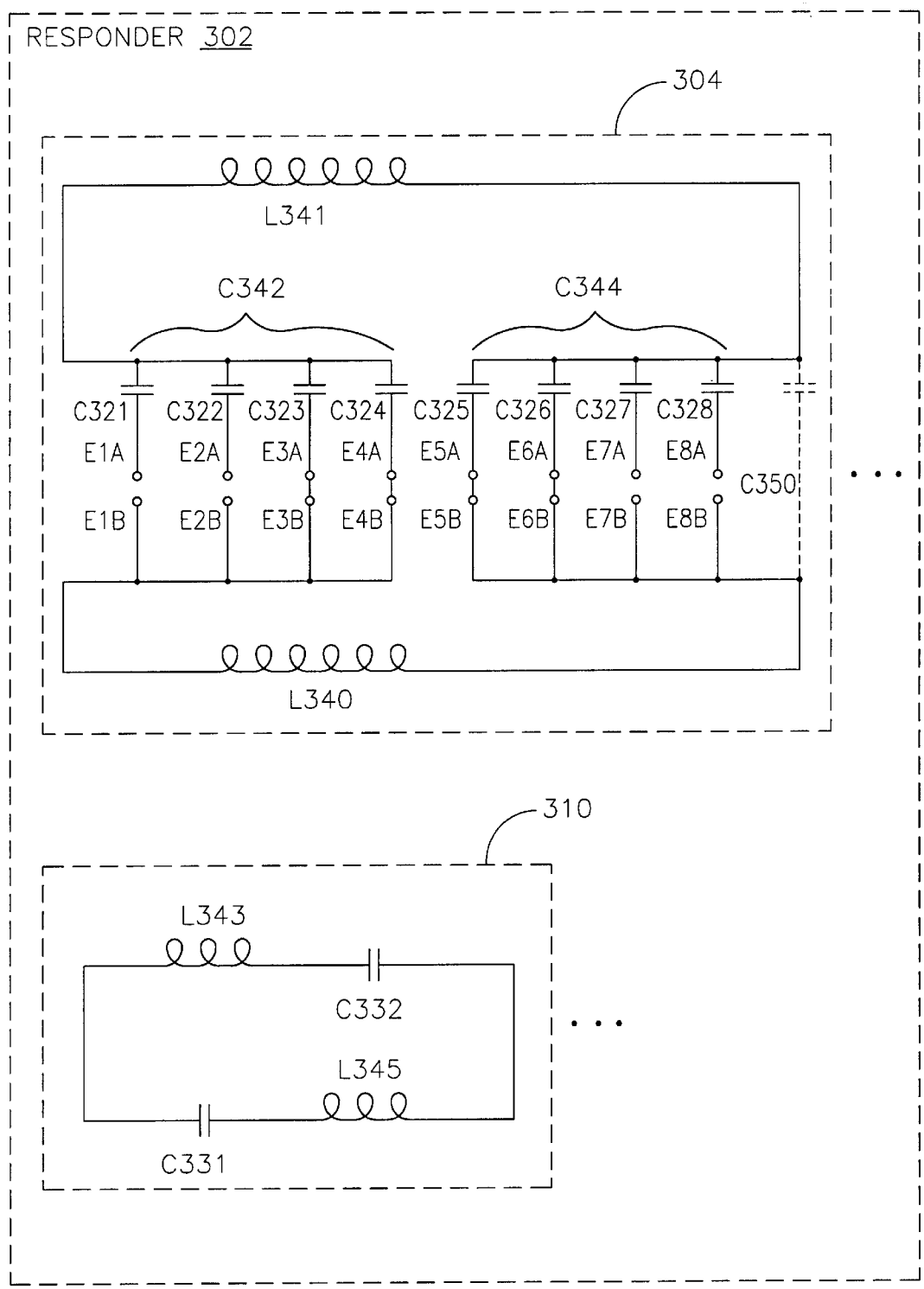
FIG. 3 is a functional block diagram of an alternate responder according to various aspects of the present invention.

Particular advantages are realized, according to various aspects of the present invention, with use of a responder having two or more passive resonant circuits. For example, responder 302 of FIG. 3 includes one or more tunable resonant circuits 304 and one or more fixed resonant circuits 310. Alternatively, all resonant circuits may be tunable or fixed.

A resonant circuit includes one or more inductors and one or more capacitors and may include other active or passive devices (e.g., resistors, diodes, transistors, analog gates, or logic components). An inductor includes any conductor exhibiting inductance (e.g., intrinsic and/or as a discrete component) in the frequency range used for detection of orientation or identification. For example, fixed resonant circuit 310 includes inductors L343 and L345 and tunable resonant circuit 304 includes inductors L340 and L341. Inductors L340 and L343 may be formed as printed circuit spirals on one side of a printed circuit substrate; and inductors L341 and L345 may be formed as printed circuit spirals on the opposite side of the substrate. Capacitor C350 represents the capacitance between conductors on each side of the substrate, including between the spiral of L340 and the spiral of L341. A capacitor includes any pair of conductors exhibiting capacitance (e.g., intrinsic and/or as a discrete component). For example, fixed resonant circuit 310 includes capacitors C331 and C332; and tunable resonant circuit includes capacitor groups C342 and C344. Each capacitor may be formed by a first conductor of the pair (e.g., a plate or trace) on one side of the substrate discussed above; and the second conductor of the pair formed on the opposite side of the substrate. With reference to the resonant circuits shown in FIG. 3, in operation, a current flows in series around each circuit that includes at least one inductor and at least one capacitor. According to conventional electrical theory and practice, such a current may exhibit a peak magnitude (e.g., a resonance) at the resonant frequency and its variation over a band of frequencies may exhibit a quality factor (i.e., Q). When a resonant circuit is located in the field of a transmitter, the resonant circuit may load the transmitter causing an effect measurable at the transmitter of the type conventionally known as a grid-dip effect.

A tunable resonant circuit includes any resonant circuit as discussed above wherein the reactance seen by the current may be modified. Such modification for circuit 304 may include the inclusion or exclusion of one or more turns of inductor L340 and/or inductor L341; and/or the inclusion or exclusion of one or more capacitors in one or both groups C342 and C344. Inclusion or exclusion may be accomplished by any conventional technique (e.g., etch cutting, deposit of conductive ink, deposit of dielectric material).

A capacitor group may include any number of capacitors of equal or diverse capacitance (e.g., a binary sequence of capacitances). For example, capacitor group C342 includes capacitors C321 through C324 of substantially equal capacitance; and capacitor group C344 includes capacitors C325 through C328 substantially equal in capacitance to corresponding capacitors C321 through C324. Identification circuit 302 includes terminal pairs for selecting the inclusion or exclusion of each capacitor. As shown, conductors remain intact between terminal pairs E3 through E6; and have been severed between terminal pairs E1, E2, E7, and E8.

When responder 302 is formed on a substrate by conventional printed circuit techniques including the connection of all terminal pairs (e.g., E1 through E8), tuning may be accomplished by selective exclusion of capacitors. Further, when inductors are formed using spirals as discussed above, a capacitor group may be located within the spiral and a second capacitor group may be located outside the spiral. To maintain a high Q of tunable resonant circuit 304 the capacitance of each group should be substantially equal after tuning. For example, the capacitance of capacitors 312 should be equal to the capacitance of capacitors 314. When capacitors in group C342 are substantially equal in capacitance to capacitors in group C344, the number of capacitors not excluded after tuning in each group should be roughly equal (e.g., a difference in number of plus or minus 0, 1, or 2).

Manufacture of responder 302 may incorporate any of the structures, materials or manufacturing steps of the type described in U.S. patent application Ser. No. 08/702,950 or U.S. Pat. No. 4,910,499 to Benge et al., incorporated herein by reference.

Figure 4:
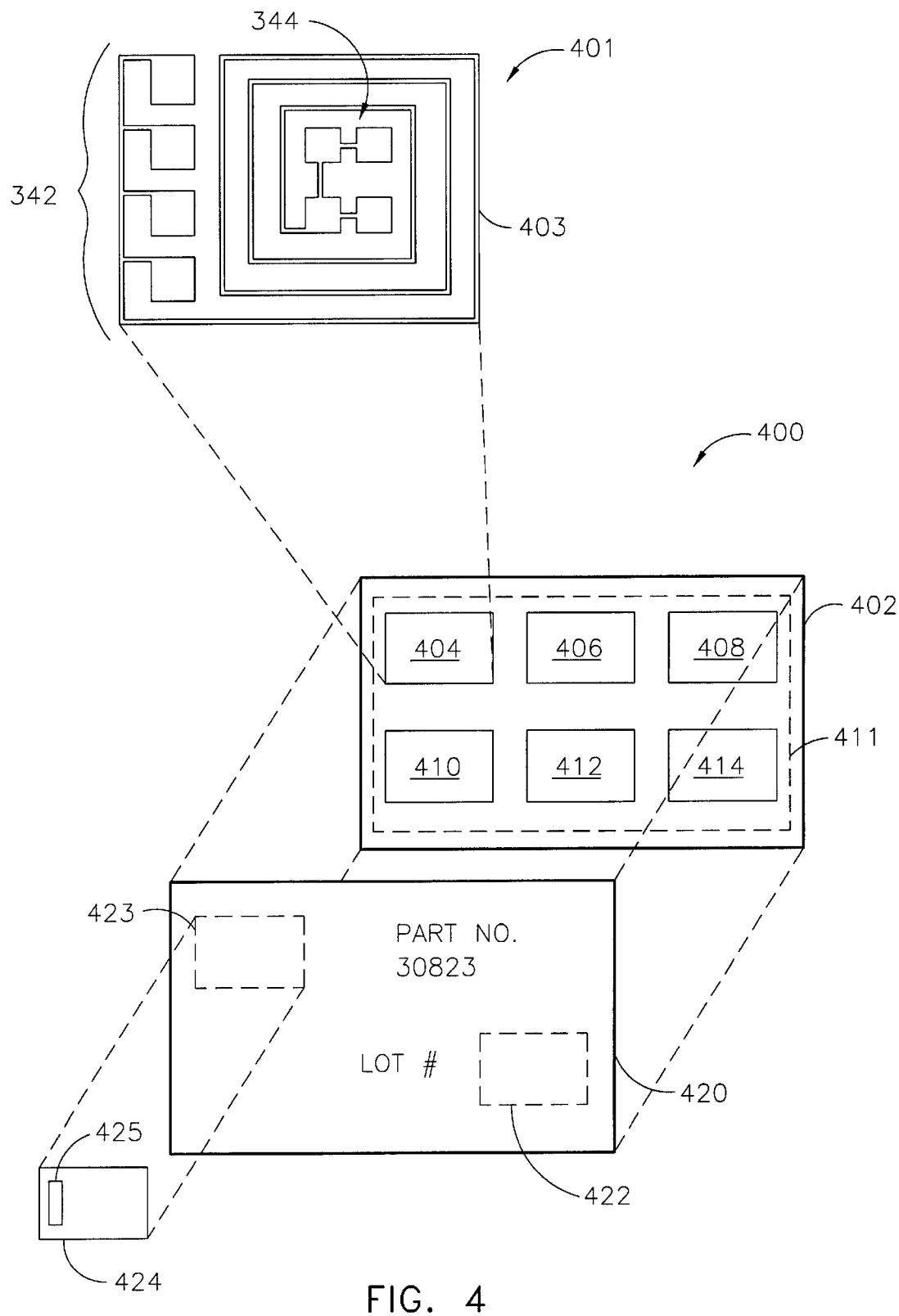
FIG. 4 is an exploded view of an exemplary implementation of a responder of the type described with reference to FIG. 3.

A responder may have multiple resonant circuits as discussed above. For example, a responder formed as label assembly 400 of FIG. 4 includes substrate 402 and facing 420. Substrate 402 includes six regions, 404, 406, 408, 410, 412, and 414 within a perimeter 410. Each region includes one or more fixed or tunable resonant circuits 304 and 310 as discussed above. For example, region 404 includes a conductor pattern 401 formed in any conventional manner (e.g., by depositing or etching) on one side of substrate 402 and a similar conductor pattern on the opposite side of substrate 402 arranged for alignment of capacitor plates and non-opposing currents in the total inductance. Inductor L341 includes coiled conductor 403. Capacitors in group C342 are formed outside all turns of coiled conductor 403. Capacitors in group 344 are formed within all turns of coiled conductor 403. A somewhat similar conductor pattern on the opposite side (not shown) of substrate 402 completes the circuit of FIG. 3 using a portion of substrate 402 as the dielectric of each capacitor C321 through C328. Use of capacitors within at least one turn of the inductance and outside substantially all turns of the inductance provides multiple effects, including: (a) plated through hole technology is avoided in formation of a complete current path for a resonant circuit; and (b) a higher Q can be realized, as discussed above.

A facing provides a cover for the conductors formed on the substrate and may also provide a preprinted surface for legends and machine readable indicia (e.g., bar code). For example, facing 420 is applied in alignment on substrate 402 so that custom printed information may be included on a generic manufactured substrate. Printed information may include regions 422 and 423 identified for the placement of one or more patches, for example, patch 424.

A responder, according to various aspects of the present invention, facilitates post-manufacturing modification of any responder function by providing a surface which may be mechanically adapted for electrically coupling a conductor to at least a portion of the responder circuitry. Such a conductor may be provided on a substrate initially separate from the responder substrate discussed above. For example patch 424 includes an adhesive backed substrate having a conductor 425 formed on the substrate by any conventional technique. At any time after manufacture of responder 400 (e.g., before being associated with an object, person, animal, or item; or before passage by a particular station controlled by a particular monitor or interrogator), patch 424 may be manually or automatically affixed to responder 400 to modify the performance of the device located in region 404.

Mechanical coupling sufficient for electrical coupling of a circuit element or conductor on a patch to the circuitry of a responder may include any conventional type of mechanical coupling (e.g., using an adhesive compound, tab and slot, hook and loop, mechanical snap, friction fit, or electrostatic adhesion). Use of conductive adhesive that does not require curing is preferred. Use of adhesive pre-applied to the back of a patch for dispensing in a peel-and-stick manner is also preferred for manual and automatic installation of patches.

A patch, according to various aspects of the present invention, includes any device for modifying one or more characteristics of a responder by being located (e.g., temporarily or permanently positioned, attached, or adhered) in electrical coupling with at least a portion of one or more responder circuits (e.g., as described above with reference to FIGS. 2B and 3). For example, patch 424 may include an adhesive backed substrate and may further include a conductor or circuit on the substrate for any form of electrical coupling to accomplish any modification of a characteristic of a responder. Coupling of the conductor or circuit of the patch to portions of the responder may be by DC coupling (e.g., conduction, supply of DC power, or resistance), by AC coupling (e.g., capacitive, inductive, or reactive), or by a combination. thereof. Exemplary structures, couplings, and functions for a patch are described in Table 2.

Any function of a responder may be modified by installation of a patch. For example, functions of a responder as described in Table 2 include, inter alia,: receiving a particular frequency band for power; receiving a particular frequency band for a query signal; providing particular power to particular portions of the responder circuitry; detecting and decoding a query signal; measuring time and providing timing signals to a power supply, a receiver, a transmitter, an encoder, or a driver; facilitating the storage of information; recalling or facilitating the recall of stored information; facilitating operations directed by sequential logic; modifying a sequence of sequential logic; transmitting a particular response in a particular frequency band; providing a response signal with a particular modulation or in a particular form; providing a response signal at a particular time and/or for a particular duration; providing a response signal that conveys particular information; and providing particular code conversions.

Any operating characteristic may be modified to accomplish modification of a function of a responder as discussed above. For example, operating characteristics of functional circuits of a responder include, inter alia,: resonant frequency of a resonant circuit; quality factor (Q) of a resonant circuit; amount of capacitance in a resonant circuit; amount of inductance in a resonant circuit; physical properties of an inductor (e.g., length of conductor, number of turns, selection of particular turns, diameter of turns layout, extent of intrinsic capacitance); amplitude of any portion of a response signal; time of providing and duration of any portion of a response signal; type of response signal (e.g., type of modulation, pulse height, pulse width, pulse spacing, duty cycle, phase angle); and as between any particular circuit nodes: switching, DC coupling, AC coupling, filtering, resistance, capacitance, inductance, coupling to another portion of the responder circuit, coupling of external signals (e.g., query signal, power signal, environmental measurements).

TABLE 2

| Purpose Accomplished by Combining a Patch With a Responder | Exemplary Responder/Patch Configurations |
|---|---|
| (1) Activate or enable a desired function of the responder. | (a) For DC coupled circuitry: Responder includes uninsulated contacts. Patch may include conductive adhesive and shunt conductor that provides DC path between responder contacts. Providing a logic level to a logic circuit may involve some shunt resistance provided either on the responder or on the patch. Providing an analog threshold voltage for enabling comparison may involve a voltage divider or biased semiconductor on the patch. Providing manual control may involve a pressure sensitive switch wholly or partially disposed on the patch.<br>(b) By DC coupling, patch may include battery power provided to enable responder circuit.<br>(c) For AC coupled circuitry: Patch may provide dielectric and one plate of a series coupling capacitor and responder may provide |

TABLE 2-continued

| Purpose Accomplished by Combining a Patch With a Responder | Exemplary Responder/Patch Configurations |
|---|---|
| | additional dielectric on an insulated contact or provide an uninsulated contact to which patch may adhere with conductive or nonconductive adhesive. Patch may provide a circuit (shunt or otherwise) with a series capacitance for each contact point of the responder. Patch may provide a circuit that includes an inductor laid out to more or less align with an inductor of the responder. Patch may provide a resonant circuit AC coupled to the responder.<br>(d) By either DC or AC coupling, patch may provide network (shunt, component, filter, etc.) to close a feedback loop enabling controlled operation.<br>(e) By DC or AC coupling, patch may provide a charge storage device for facilitating operative power, development of a particular voltage from a charge pump, or complete the structure of a memory device. |
| (2) Modify an existing operating characteristic of the responder. | (a) Patch may modify a resonant frequency of a resonant circuit by AC coupling additional reactance (additive or subtractive e.g., out of phase inductor turns). Patch may modify timing circuit by adding DC coupling resistance or AC coupling capacitance into a resistor-capacitor timing network.<br>(b) Patch may modify Q of a responder resonant circuit by loading the responder resonant circuit via AC coupling of a patch resonant circuit. Patch may modify amplitude of response signal by varying the extent of inductance vs. capacitance in a tuned antenna circuit as discussed above.<br>(c) By AC or DC coupling, patch can apply clock signals to a logic circuit. By DC coupling, patch can apply a logic level signal to a logic circuit.<br>(d) Patch may provide additional tuned antenna circuit at any frequency. When near responder's frequency, additional antenna may shape responders antenna field pattern. |
| (3) Supplement existing functions by providing a desired new function. | (a) Patch may have complete circuitry for functions of orientation and/or identification that may overlap a region where the responder has no circuitry; or, where the responder's circuitry will be overlapped with the patch in a way that will be detectable from a monitor or interrogator.<br>(b) Patch may provide different orientation and/or identification functions, e.g., beacon on top of non-beacon responder and vice versa, different or additional identification code, or programmed memory (e.g., additional serial memory).<br>(c) Patch may combine the circuitry of adjacent regions by overlapping both in full or in part. The resulting coupled circuit may have frequency or other operating characteristics that are new.<br>(d) Patch may provide new component in series or parallel with responder circuit to provide different type of sensor, a semiconductor, or an indicator (e.g., LED, or patch printed with ink having thermal sensitive color). |
| (4) Deactivate or disable an existing function of the responder. | (a) Patch may provide by DC or AC coupling, signal routing or signal shunting to ground so as to disable any responder function.<br>(b) Patch may interfere with power being provided to the circuit that performs the function to be disabled. |
| (5) Substitute a desired new function for an existing function of the responder. | (a) When responder has blocking gate, patch may enable blocking gate and introduce signals by DC or AC coupling as discussed above.<br>(b) When responder has series shunt closed by a first type of patch, the first type may be removed and a second type of patch put in its place to provide different signal coupling. |

Several operational advantages accompany use of one or more patches on a responder. For example, when a patch is used prior to a particular detection point, existence of the patch may be used to permit or deny access for security purposes; or permit or deny passage through a physical or logical gateway or process step. A process of materials handling, fabrication, manufacturing, assembly or test may be changed in response to whether a patch is detected in association with a particular responder or a group of responders. A record of whether or not a patch accompanied a particular responder may be made by system 100 and reported to other business computer systems as discussed above. An alarm may be activated or may be deactivated based on detection or failure to detect a patch in association with a particular responder or group of like responders. Existence of a patch as detected with a particular responder may disable further detection of responders of the same or a different type.

Figure 5:
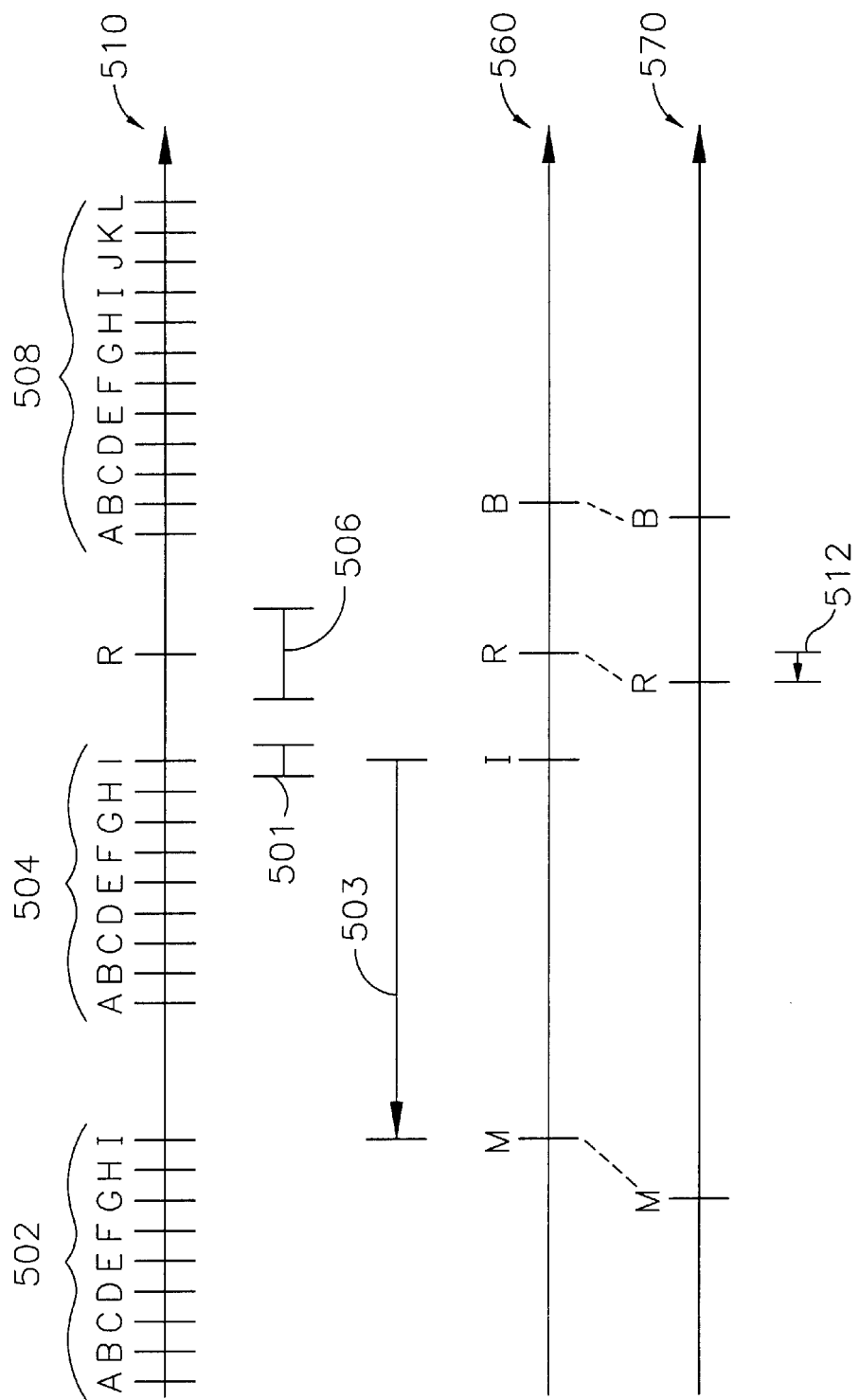
FIG. 5 is a graph frequency spectra for the design and operation of a responder according to various aspects of the present invention.
Figure 6:
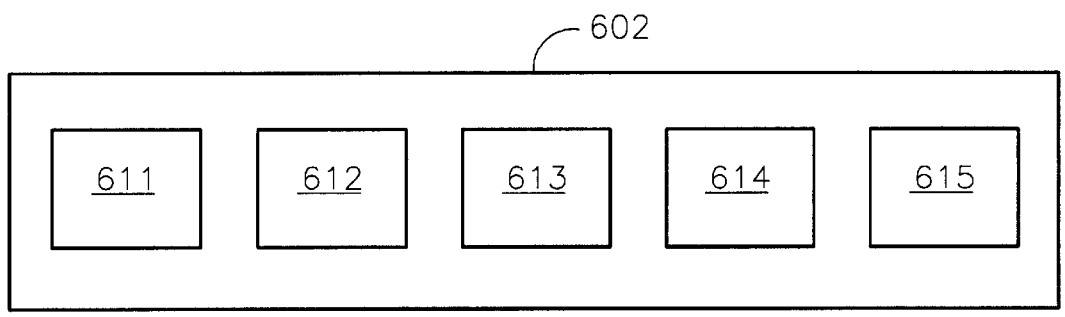
FIGS. 6 through 8 each present a plan view of the general layout of resonant circuits for a responder according to various aspects of the present invention.

An example of the frequency characteristics of resonant circuits designed on substrate 402, as discussed above, is shown in FIG. 5. Spectrum 510 of increasing frequencies from left to right, includes band 502, band 504, referenced frequency R and band 508. Band 504 includes designated frequencies 504-A through 504-I and band 508 includes designated frequencies 508-A through 508-L. When substrate 402 is manufactured according to designated frequencies illustrated as spectrum 560, resonant circuit at region 408 may have resonant frequency 560-R; resonant circuit at region 406 may have designated frequency 560-B and resonant circuit 401 at region 404 may have designated frequency 560-I. After placement of a suitable patch 424, the resonant frequency of the resonant circuit at region 401 may shift an amount 503 to from frequency 560-I to frequency 560-M corresponding to frequency 502-I in band 502.

In operation, intrinsic and extrinsic factors that modify the resonant frequencies of the resonant circuits at region 401 and patch 424 are illustrated in spectrum 570. Variation in intrinsic factors (e.g., manufacturing tolerances, temperature, or humidity) and in extrinsic factors (e.g., noise, proximity of shielding or reflective surfaces, orientation of label assembly 400 with respect to antenna structures, and proximity to objects which may have a tendency to de-tune a resonant circuit such as large metal objects or other resonant circuits) may cause any actual (or temporally current) resonant frequency of resonant circuit 401 to differ from the design center frequency, for example frequency 560-I may vary in range 501. These factors may cause resonant circuits to exhibit actual frequencies 570 that differ from design frequencies 560. For example, frequency 560-B may shift to frequency 570-B, frequency 560-R may shift a somewhat greater amount to frequency 570-R, and frequency 560-M may shift a still greater amount to frequency 570-M.

When frequency 570-R is detected within band 506, the difference between frequency 570-R and the design frequency 510-R provides an indication of the environment in which label assembly 400 is currently operating. By accounting for the operating environment (e.g., intrinsic and extrinsic factors), frequency 570-B is recognized as corresponding to frequency 508-B. Also, frequency 570-M is recognized as frequency 502-I, accounting for the combined effects of patch 424 (offset 503), variation of frequency within range 501, and variation of frequency within range 506 (offset 512).

Figure 7:
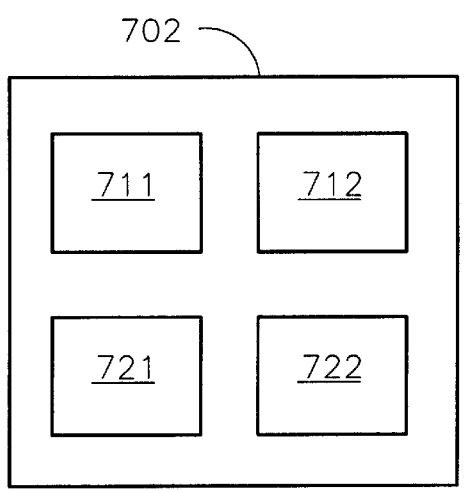
Figure 8:
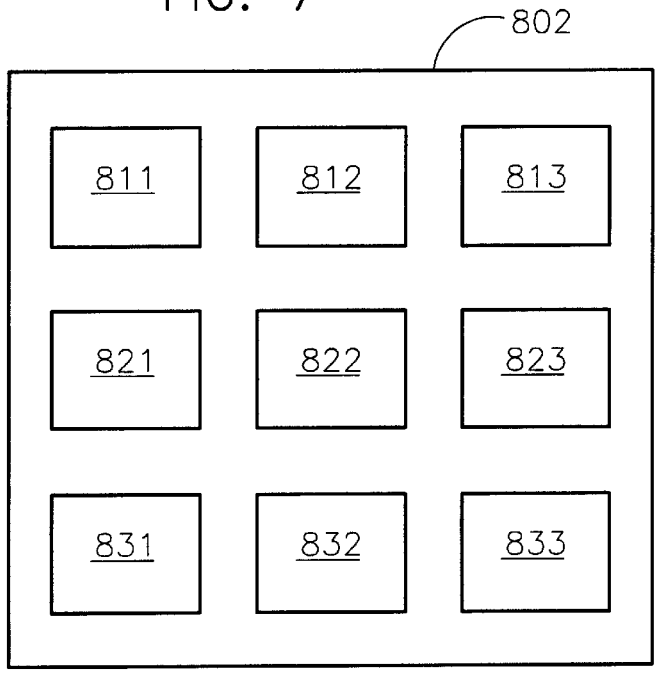

Multiple resonant circuits may be arranged for a planar responder 302 (e.g., on the substrate of label assembly 400) in a wide variety of general layouts with one resonant circuit in each of several regions. For example, planar responder 602 includes regions 611, 612, 613, 614, 615, arranged linearly. Planar responder 702 of FIG. 7 includes regions 711, 712, 721, 722 arranged in 2×2 matrix. Planar responder 802 of FIG. 8 includes a 3×3 matrix of regions 811 through 833. In any of the above planar responder configurations, any one or more regions may be designated to exhibit one or more known reference frequencies, (e.g., frequency R) or frequencies selected from predetermined bands. Further, a corresponding resonant circuit may be omitted from any one or more regions. The variations discussed above facilitate determining the orientation of the label assembly with reference to a grid antenna, expand the number of identifications possible for a label assembly (e.g., an identification may include the position of a resonant circuit having a frequency within a particular band, and the identification may include omission of a resonant circuit), and may facilitate manufacturing tests of a web of planar responders prior to or following the step of shearing the web to form individual substrates.

Although each region in FIGS. 4, 6, 7, and 8 is shown as a rectangular or square area, the shape and arrangement of resonant circuits, according to various aspects of the present invention, may include any desired shapes or arrangements within a perimeter (e.g., 410), including for example any geometric shape. A region and patch may be configured (e.g., symmetric, redundant, or loosely coupled) to accommodate a patch such that misalignment of the patch within the perimeter of the region has little or no effect on the patch's function. Indications on the patch, the facing, or both may help prevent misalignment of the patch or application of an incorrect patch.

A patch may couple to the resonant circuit on a substrate by capacitive coupling or by inductive (magnetic) coupling. Capacitive coupling may be used to join a capacitor already included in the resonant circuit with a capacitor that had been excluded from the resonant circuit. Such capacitive coupling may create a three plate capacitive structure as shown in FIG. 9.

Figure 9:
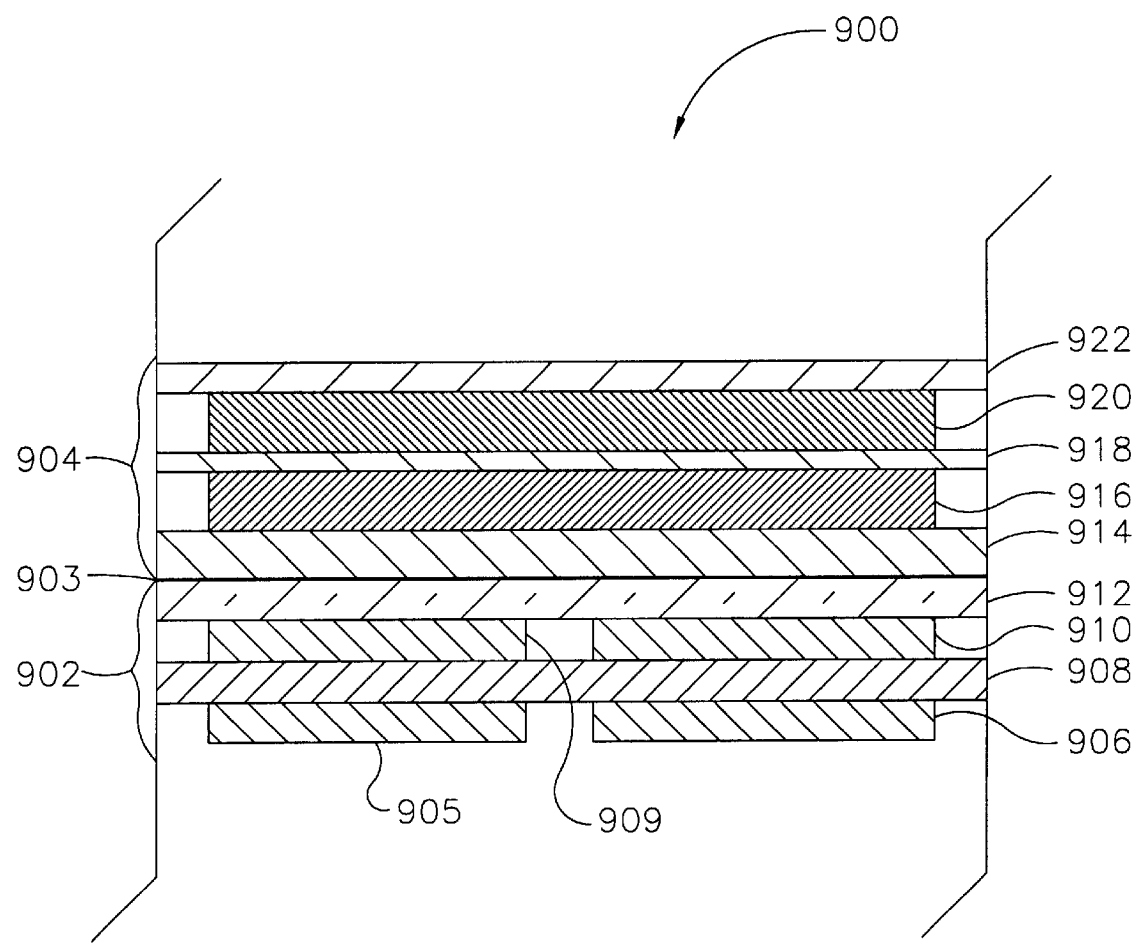
FIG. 9 is a cross section view of a responder having plural substrates according to various aspects of the present invention.

A cross section of a label assembly and patch is presented in FIG. 9. Label assembly 902 is separated by patch 904 by a layer of adhesive 903 accompanying patch 904. Label assembly 902 includes conductors 905 and 906 (each forming a first plate of capacitors C324 and C325 respectively), substrate 908, conductors 909 and 910 (each forming the second plate of capacitors C324 and C325, respectively), and facing 912. Patch 904 includes adhesive 903, backing 914, conductor 916, substrate 918, conductor 920, and cover 922. Conductor 920 and cover 922 may be omitted. When substrate 918 is used as a backing in place of backing 914, backing 914 may be omitted and adhesive 903 applied to substrate 918. Conductor 916 forms a capacitor by acting as another plate over conductor 909 and a second capacitor by acting as another plate over conductor 910. In this manner, conductor 916 provides capacitive coupling to join in series capacitors C324 and C325. When conductor 920 is included in patch 904, the cooperation of conductor 920 and conductor 916, as separated by a dielectric formed from substrate 918, may serve to provide additional capacitance in series between capacitors C324 and C325. When conductor 916 (or both conductors 916 and 918) overlap turns of an inductor, the reactance of the inductor may be modified as discussed above.

Figure 10:
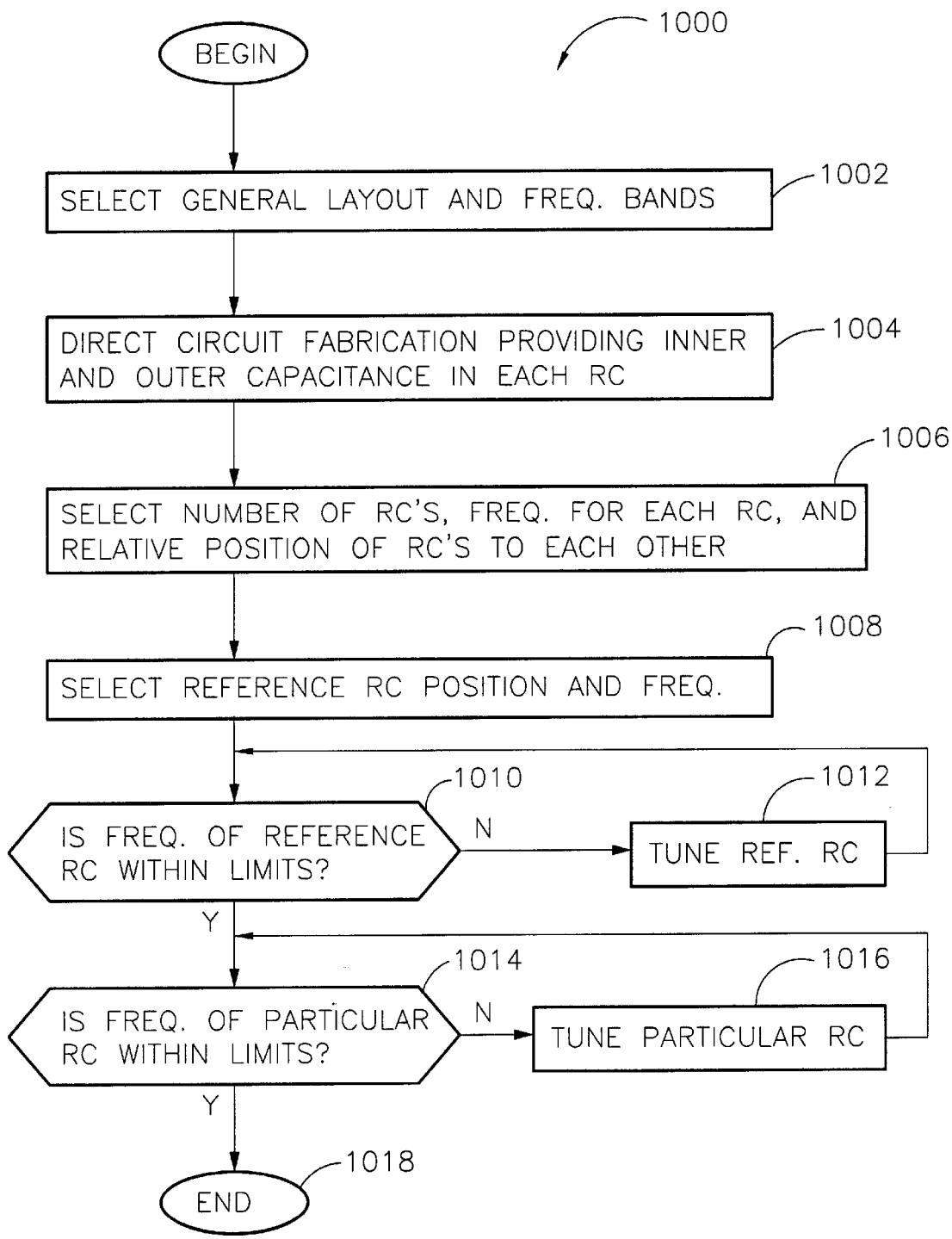
FIG. 10 is a flow diagram for a method of manufacturing and testing a responder according to various aspects of the present invention.

A method, according to various aspects of the present invention, of providing a responder as discussed above includes any method for combining multiple resonant circuits (RC's) into a single assembly. The positional relationship between RC's may be planar (e.g., on a substrate), may be overlapping (e.g., as a laminate of substrates or patches), or may take any convenient shape integrated (on manufacture or on subsequent assembly) with an item to be identified or whose orientation is to be detected (e.g., a label on a round flask or a deposition on the interior of a body of a toy). For example, method 1000 of FIG. 10 includes the following steps.

At step 1002 a general layout of the responder as to the relative positions of RC's is determined. Any of the layouts discussed above with reference to FIGS. 4, 6, 7, and 8 may be selected. When RC's are manufactured in bulk on a web (e.g., 36 RC's wide), the selection of a particular layout may be made at any time before shearing of the web into discrete responders (e.g., immediately upon selection of a layout or after tuning). Also, the frequency bands to be used for various RC's of a responder may be selected or determined for the purpose of selecting among RC designs, prefabricated RC's (e.g., standard cells), or placement of RC patterns or components according to the general layout. When the indicia of identification is to include spacial variables (e.g., absence of an RC at a particular position, or presence of an RC of a particular band or resonant frequency at a particular position), then the selection of layout and bands may be accomplished with reference to a table of layouts, positions, bands, and/or resonant frequencies designated by particular values for the intended indicia of identification. Control then passes to step 1004.

At step 1004 circuit fabrication for the layout determined in step 1002 is accomplished wherein capacitor groups as discussed above are formed respectively inside and outside one or more turns of one or more inductors. Any conventional circuit fabrication technologies may be used (e.g., printed circuit, semiconductor fabrication, deposition of conductive ink, and placement of adhesive decals). Formation of one or more responders simultaneously by tape or web manufacturing may also be accomplished in any conventional manner. Control then passes to step 1006.

At step 1006 indicia for detection of orientation and/or indicia for determining identification are specified by selecting a number of RC's for each responder along with specifying a resonant frequency for each RC and a relative position of RC's to each other. Predetermined combinations of these parameters may be arranged in a table for selection on the basis of desired indicia. Allowance is made for the resolution provided by the grid antenna and transceiver for particular applications. Control then passes to step 1008.

At step 1008 one or more of the RC's selected in step 1006 is designated as a reference RC and a reference resonant frequency for each reference RC is selected. This selection may be by table look up as discussed above or may be a position outside the responder (e.g., on a web of devices) for use prior to shearing (e.g., during manufacturing, testing, dispensing, or just prior to delivery). Control then passes to step 1010.

At steps 1010 and 1012 each reference RC is tuned in a loop that includes a test (e.g., using conventional laboratory equipment or using an interrogator or controller as discussed above) to determine whether a measured response is within suitable limits, and if not to perform any conventional tuning technique (e.g., selective inclusion or exclusion of components or portions of circuitry as discussed above, addition of material to form supplemental circuitry or to add reactance to existing circuitry). If a reference RC is of the fixed type as discussed above, rejection at step 1010 may be followed by disposal of nonconforming product. When the RC's resonant frequency is within the desired limits, control passes to step 1014.

At steps 1014 and 1016 each remaining RC is tuned in a loop that includes a test (e.g., using conventional laboratory equipment or using an interrogator or controller as discussed above) to determine whether a measured response is within suitable limits, and if not to perform any conventional tuning technique (e.g., selective inclusion or exclusion of components or portions of circuitry as discussed above, addition of material to form supplemental circuitry or to add reactance to existing circuitry). Limits used in step 1014 may be adjusted for an offset (e.g., offset 512, discussed above), for example, when steps 1008 and 1010 are performed with an intervening lapse of time or transfer from one environment to another. If such an RC is of the fixed type as discussed above, rejection at step 1014 may be followed by disposal of nonconforming product. Steps 1014 and 1016 may be used with all RC's on a web with reference to one or more reference RC's located on the web for accommodating manufacturing tolerances that are likely to apply to all RC's on the web. When all RC's have resonant frequencies within appropriate limits, control passes to step 1018. At step 1018, the responder or devices are ready for packaging, dispensing, integration, or deployment. When manufactured in a web, shearing may follow step 1014.

Figure 11:
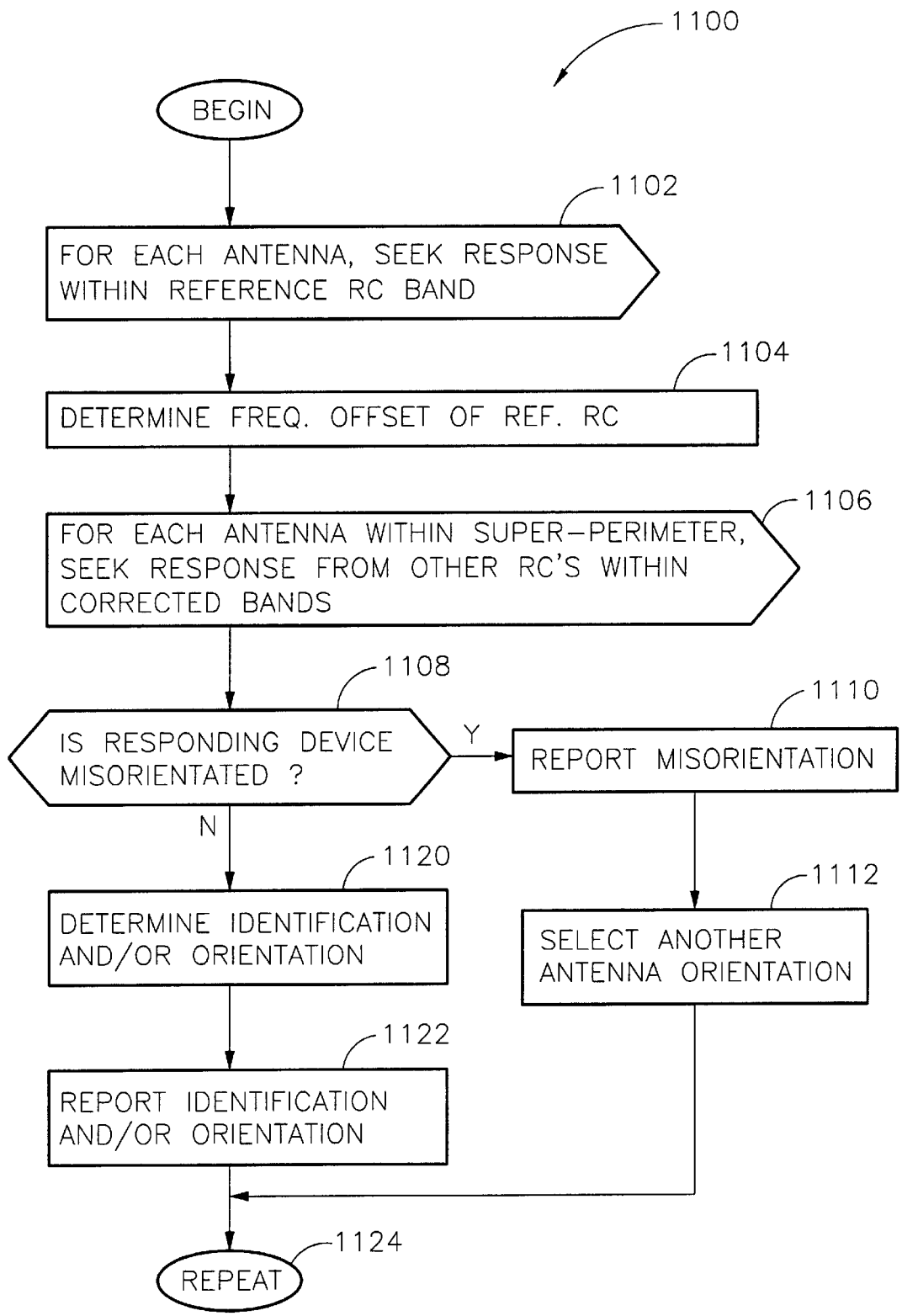
FIG. 11 is a flow diagram for a method of detecting and identifying a responder according to various aspects of the present invention.

A method, according to various aspects of the present invention, of detecting the orientation and/or identification of a responder as discussed above includes any method for deriving resonant circuit frequency and position information using communication technology. For example, method 1100 of FIG. 11 includes the following steps.

At step 1102 a subroutine is called repeatedly to acquire each possible or expected response for each antenna field pattern that corresponds to a different location within the set of locations being monitored by the system. For example, in system 100, each location-unique antenna field pattern of antenna structure 102 may be included. Further, each location-unique antenna field pattern of antenna structure 104 may be included simultaneous with those of antenna structure 102 or in any series. The subroutine may be called for each possible or expected reference resonant frequency (e.g., 570-R). Scan methods of the type described in U.S. patent application Ser. No. 09/372,274, filed Aug. 11, 1999, by Rodgers et al. may be used. When a reference resonant frequency is observed, control passes to step 1104.

At step 1104, an offset (e.g., 512) is determined by taking the absolute value of the difference between the observed reference resonant frequency (e.g., 570-R) and a predetermined reference resonant frequency (e.g., 510-R). This step may include calculation of more than one offset when more than one reference frequency is observed at one antenna field pattern location. Control then passes to step 1106.

At step 1106, a subroutine is called for each antenna field pattern location that may be within a super-perimeter of the location of the reference resonant frequency observed in step 1102. The super-perimeter includes all locations relative to the reference RC for all orientations of the expected responder. When such locations are expected to lie in a plane, for example, the super-perimeter is transcribed by a circle having a radius at a minimum longer than the furthest separation of any RC of the responder and the reference RC. Preferably, reference RC's are centrally located on the responder to limit the extent of the super-perimeter. When seeking responses, the bands in which a response is expected to be observed are corrected in accordance with the offset derived in step 1104. Correction may be by a conventional linear extrapolation, or by any nonlinear technique (e.g., table look-up) to accommodate a possible nonlinear variation in the effects attributed to the offset. For example, as discussed above, a different value of offset may be suitable for different frequency bands (e.g., 570-B to 508-B may differ from 570-M to 502-I). When one or more RC responses have been noted, control passes to step 1108.

At step 1108, it is determined whether the responding responder is misoriented with respect to one or more antenna structures. Misorientation (or recognition of one or more proper orientations) may be determined simply when no more than one response is permitted in one antenna field pattern. In a more complex algorithm, the positional relationship of more than one response may be considered to determine that such a relationship does not comport with a predetermined expected set of relationships. If a misorientation is detected, control passes to step 1110; otherwise, control passes to step 1120.

At step 1110 each misorientation detected in the previous step is reported by any conventional mechanism (e.g., logging on a display or in a database for quality management purposes for noncritical misorientations, activating an alarm to call manual attention to a critical misorientation, sending a message to a process or control system for system level control actions such as stopping a process or initiating coordinating or corrective actions). Control passes next to step 1112.

At step 1112, another antenna field pattern or antenna structure may be selected to further detect orientation or identification. For example, when responder 122 is determined to be misoriented as detected by antenna structure 102, identification may be accomplished via antenna structure 104 to which the responder may not be misoriented. Control then passes to step 1124.

At step 1120, further communication may be used to more specifically determine orientation and/or identification. When several different orientations are permissible at step 1108, a particular orientation may be detected in any manner as discussed above with reference to steps 1102, 1106, and 1108. When indicia of identification are to be determined in addition to orientation and the orientation of the responder is known or suitably oriented for further communication that may be necessary to determine all indicia of identification, any further communication as discussed above may be employed. Further communication may first identify the actual perimeter (e.g., 402) within which all responding RC's are located. The resonant frequency of each RC including spatially overlapping RC's (e.g., overlapping by design or by application of patches as discussed above) may be determined in any conventional manner, for example, as discussed above with reference to step 1102. When all indicia of orientation and/or identification are known, control then passes to step 1122.

At step 1122, orientation and/or identification are reported in any conventional manner (e.g., to an operator, a process controller, or a facility management computer system).

At step 1124, method 1100 is repeated at a rate consistent with the expected introduction of unrecognized responders or at a sampling rate when some responders are not expected to be fully detected or interrogated.

As discussed above, the responder may include a plurality of regions, for example, regions 404 through 414. In an alternate responder, each region may be occupied with a resonant circuit and/or any conventional responder including a device that responds with coded indicia of identification. For example, one or more regions may include in addition or by substitution a responder of the type described in U.S. patent application Ser. No. 09/372,274, filed Aug. 11, 1999, by Rodgers et al., incorporated herein by reference. Communication with a reference RC at region 408 may then be followed by communication with such coded response responders at other regions (e.g., 406, 410, 412, 414).

The foregoing description discusses preferred embodiments of the present invention which may be changed or modified departing from the scope of the present invention as defined in the claims. While for sake of clarity of description, several specific embodiments of the invention have been described, the scope of the invention is intended to be measured by the claims as set forth below.

What is claimed is:

1. A method for determining an identity of a responder, the responder comprising a plurality of resonant circuits and a reference resonant circuit all arranged within a perimeter, the method comprising:

providing a first grid antenna having a plurality of antenna field patterns located with respect to a first grid having a plurality of cells;

for a multiplicity of cells of the first grid, detecting a first signal from the reference resonant circuit;

determining a set of cells of the plurality, each cell of the set being within a super-perimeter enclosing a selected cell of the multiplicity;

determining an offset in accordance with a difference between a frequency of the first signal and a predetermined frequency;

for cells of the set, detecting a respective second signal from each resonant circuit of the plurality in accordance with the offset;

associating a respective cell of the set to each respective second signal; and determining the identity of the responder in accordance with positional relationships among the associated cells.

2. The method of claim 1 wherein the plurality of cells comprises an array.

3. The method of claim 1 wherein each resonant circuit of the plurality is arranged in a second grid within the perimeter.

4. The method of claim 3 wherein a cell spacing of the first grid is smaller than a cell spacing of the second grid.

5. The method of claim 1 wherein the selected cell of the multiplicity corresponds to a cell of the multiplicity having a maximal detection of the first signal.

6. The method of claim 1 wherein each second signal is received at a frequency in accordance with the offset.

7. The method of claim 1 wherein each second signal is received at a frequency determined from the difference between a predetermined frequency and the offset.

8. The method of claim 1 wherein detecting each second signal comprises transmitting at a frequency in accordance with the offset.

9. The method of claim 1 wherein detecting each second signal comprises transmitting at a frequency determined from the difference between a predetermined frequency and the offset.

10. The method of claim 1 wherein detecting the first signal comprises testing each cell of the multiplicity in sequence.

11. The method of claim 1 wherein associating comprises selecting a cell having a maximal detection of the second signal.

12. The method of claim 1 wherein determining the identity is further in accordance with a frequency of the second signal.

13. The method of claim 1 further comprising determining that the responder is misaligned with respect to the first grid when more than one resonant circuit is associated with one cell of the multiplicity.

14. The method of claim 13 further comprising providing a second grid antenna for use in place of the first grid antenna when the responder is determined to be misaligned with the first grid.

15. The method of claim 1 wherein the reference resonant circuit is centrally located among resonant circuits of the plurality.

16. A memory comprising indicia of the method of claim 1.

17. A method for determining an identity of a responder, the responder comprising a plurality of resonant circuits and a reference resonant circuit all arranged within a perimeter, the method comprising:

providing a first grid antenna having a plurality of antenna field patterns located with respect to a first grid having a plurality of cells;

for a multiplicity of cells of the first grid, detecting a first signal from the reference resonant circuit;

determining a set of cells of the plurality, each cell of the set being within a super-perimeter enclosing a selected cell of the multiplicity;

determining an offset in accordance with a difference between a frequency of the first signal and a predetermined frequency;

for cells of the set, detecting a respective second signal from each resonant circuit of the plurality in accordance with the offset; and determining the identity of the responder in accordance with a frequency of each respective second signal.

18. The method of claim 17 wherein the plurality of cells comprises an array.

19. The method of claim 17 wherein each resonant circuit of the plurality is arranged in a second grid within the perimeter.

20. The method of claim 19 wherein a cell spacing of the first grid is smaller than a cell spacing of the second grid.

21. The method of claim 17 wherein the selected cell of the multiplicity corresponds to a cell of the multiplicity having a maximal detection of the first signal.

22. The method of claim 17 wherein each second signal is received at a frequency in accordance with the offset.

23. The method of claim 17 wherein each second signal is received at a frequency determined from the difference between a predetermined frequency and the offset.

24. The method of claim 17 wherein detecting each second signal comprises transmitting at a frequency in accordance with the offset.

25. The method of claim 17 wherein detecting each second signal comprises transmitting at a frequency determined from the difference between a predetermined frequency and the offset.

26. The method of claim 17 wherein detecting the first signal comprises testing each cell of the multiplicity in sequence.

27. The method of claim 17 wherein associating comprises selecting a cell having a maximal detection of the second signal.

28. The method of claim 27 further comprising providing a second grid antenna for use in place of the first grid antenna when the responder is determined to be misaligned with the first grid.

29. The method of claim 17 wherein the reference resonant circuit is centrally located among resonant circuits of the plurality.

30. A memory comprising indicia of the method of claim 17.

31. A method for determining whether a responder is misoriented in a detection field, the responder comprising a plurality of resonant circuits and a reference resonant circuit all arranged within a perimeter, the method comprising:
providing a first grid antenna having a plurality of antenna field patterns located with respect to a first grid having a plurality of cells;
for a multiplicity of cells of the first grid, detecting a signal from the reference resonant circuit in;
determining a set of cells of the plurality, each cell of the set being within a super-perimeter enclosing a selected cell of the multiplicity;
determining an offset in accordance with a difference between a frequency of the first signal and a predetermined frequency;
for cells of the set, detecting a respective second signal from each resonant circuit of the plurality in accordance with the offset;
associating at least one respective cell of the set to each respective second signal; and
determining that the responder is misoriented when a second signal is associated with more than one cell.

32. The method of claim 31 wherein the plurality of cells comprises an array.

33. The method of claim 31 wherein each resonant circuit of the plurality is arranged in a second grid within the perimeter.

34. The method of claim 33 wherein a cell spacing of the first grid is smaller than a cell spacing of the second grid.

35. The method of claim 31 wherein the selected cell of the multiplicity corresponds to a cell of the multiplicity having a maximal detection of the first signal.

36. The method of claim 31 wherein each second signal is received at a frequency in accordance with the offset.

37. The method of claim 31 wherein each second signal is received at a frequency determined from the difference between a predetermined frequency and the offset.

38. The method of claim 31 wherein detecting each second signal comprises transmitting at a frequency in accordance with the offset.

39. The method of claim 31 wherein detecting each second signal comprises transmitting at a frequency determined from the difference between a predetermined frequency and the offset.

40. The method of claim 31 wherein detecting the first signal comprises testing each cell of the multiplicity in sequence.

41. The method of claim 31 wherein associating comprises selecting a cell having a maximal detection of the second signal.

42. The method of claim 31 wherein determining the identity is further in accordance with a frequency of the second signal.

43. The method of claim 31 further comprising determining that the responder is misaligned with respect to the first grid when more than one resonant circuit is associated with one cell of the multiplicity.

44. The method of claim 43 further comprising providing a second grid antenna for use in place of the first grid antenna when the responder is determined to be misaligned with the first grid.

45. The method of claim 31 wherein the reference resonant circuit is centrally located among resonant circuits of the plurality.

46. A memory comprising indicia of the method of claim 31.

47. A system for determining an identity of a responder, the responder comprising a plurality of resonant circuits and a reference resonant circuit all arranged within a perimeter, the system comprising:
means for providing a plurality of antenna field patterns located with respect to a first grid having a plurality of cells;
means for detecting, from at least one cell of a multiplicity of cells of the first grid, a first signal from the reference resonant circuit;
means for determining a set of cells of the plurality, each cell of the set being within a super-perimeter enclosing a selected cell of the multiplicity;
means for determining an offset in accordance with a difference between a frequency of the first signal and a predetermined frequency;
means for detecting a respective second signal from each resonant circuit of the plurality in accordance with the offset;
means for associating a respective cell of the set to each respective second signal; and
means for determining the identity of the responder in accordance with positional relationships among the associated cells.

48. A system for determining an identity of a responder, the responder comprising a plurality of resonant circuits and a reference resonant circuit all arranged within a perimeter, the system comprising:
means for providing a plurality of antenna field patterns located with respect to a first grid having a plurality of cells;

means for detecting, from at least one cell of the multiplicity of cells of the first grid, a first signal from the reference resonant circuit;

means for determining a set of cells of the plurality, each cell of the set being within a super-perimeter enclosing a selected cell of the multiplicity;

means for determining an offset in accordance with a difference between a frequency of the first signal and a predetermined frequency;

means for detecting in accordance with the offset and for each resonant circuit of the plurality a respective second signal at a respective cell of the set; and means for determining the identity of the responder in accordance with a frequency of each respective second signal.

49. A system for determining whether a responder is misoriented in a detection field, the responder comprising a plurality of resonant circuits and a reference resonant circuit all arranged within a perimeter, the system comprising:

means for providing a plurality of antenna field patterns located with respect to a first grid having a plurality of cells;

means for detecting, from at least one cell of the multiplicity of cells of the first grid, a first signal from the reference resonant circuit;

means for determining a set of cells of the plurality, each cell of the set being within a super-perimeter enclosing a selected cell of the multiplicity;

means for determining an offset in accordance with a difference between a frequency of the first signal and a predetermined frequency;

means for detecting a respective second signal from each resonant circuit of the plurality in accordance with the offset;

means for associating at least one cell of the set to each respective second signal; and means for determining that the responder is misoriented when a second signal is associated with more than one cell.

* * * * *